UNITED STATES PATENT OFFICE.

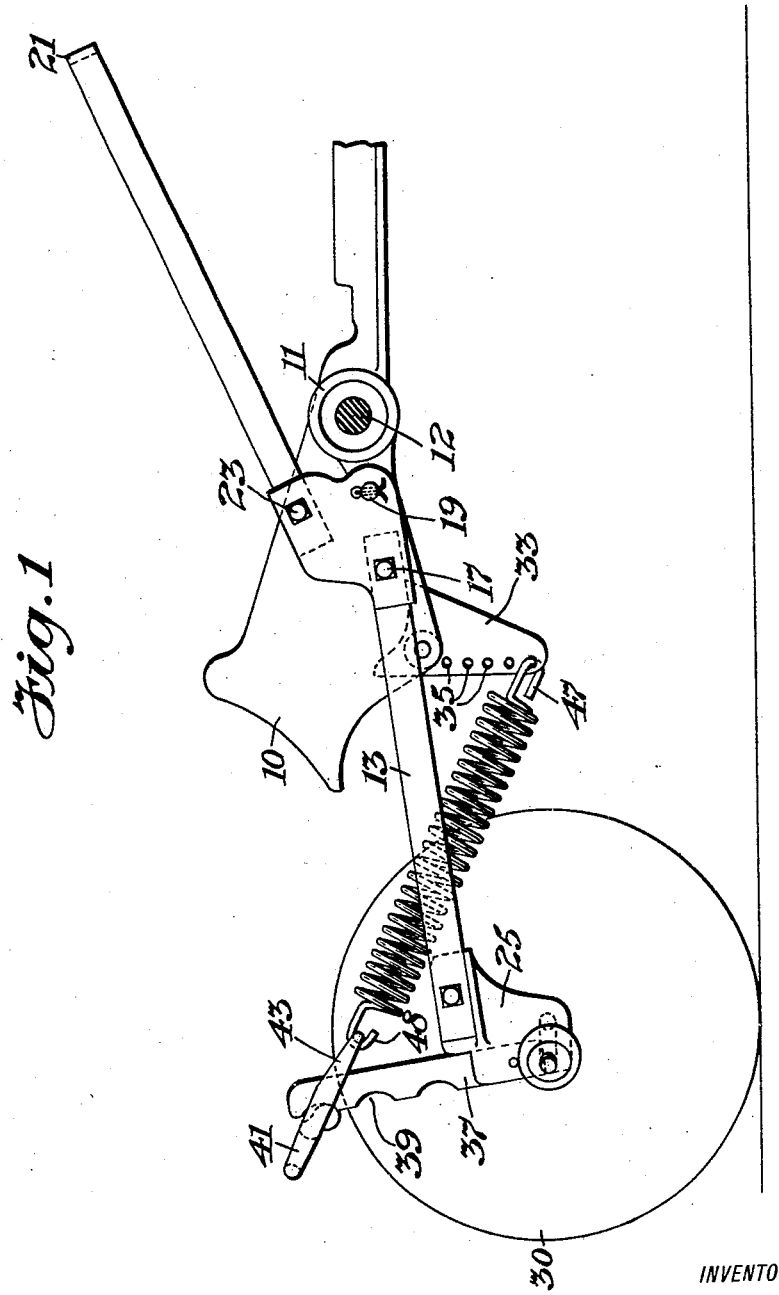

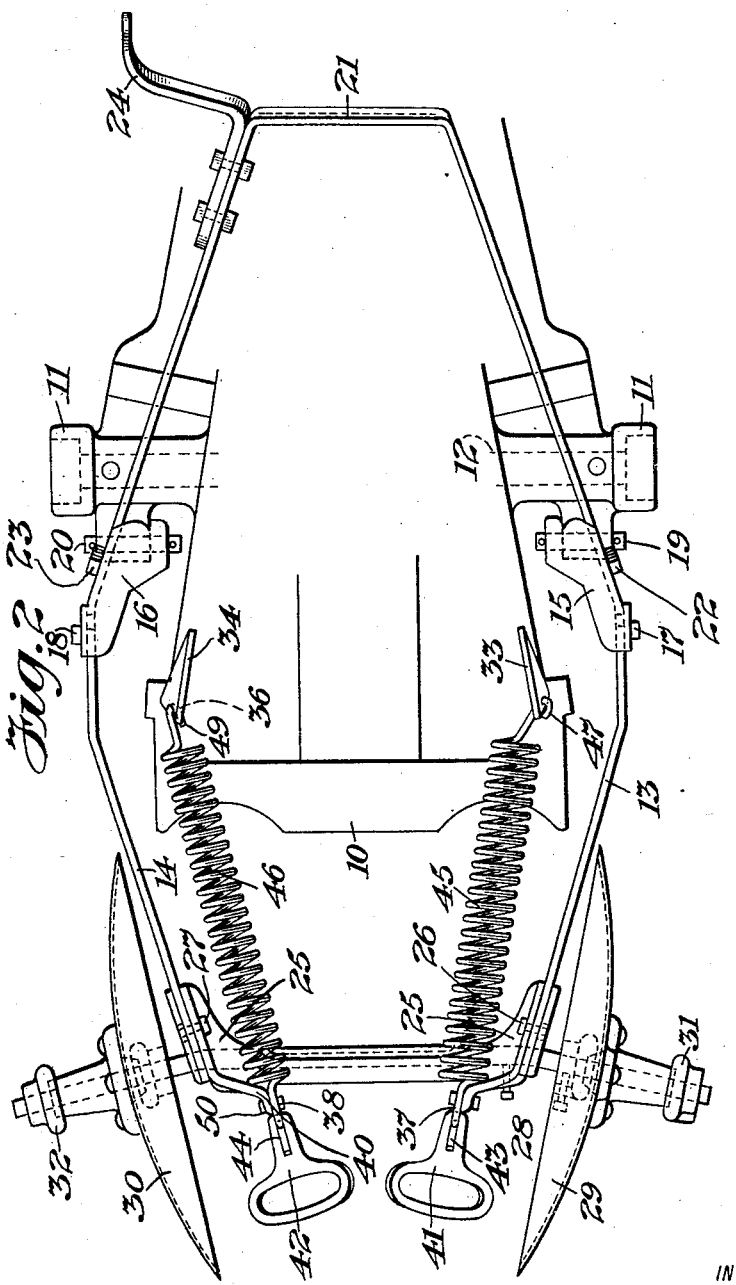

LEWIS AUGUSTUS ASPINWALL, OF JACKSON, MICHIGAN, ASSIGNOR TO ASPINWALL-DREW COMPANY, OF JACKSON, MICHIGAN, A CORPORATION OF MICHIGAN.

POTATO PLANTER.

1,411,897.  Specification of Letters Patent.  Patented Apr. 4, 1922.

Application filed February 23, 1921. Serial No. 447,138.

*To all whom it may concern:*

Be it known that I, LEWIS AUGUSTUS ASPINWALL, a citizen of the United States, residing at Jackson, in the county of Jackson and State of Michigan, have invented an Improvement in Potato Planters, of which the following is a specification.

This invention relates to a potato planter and more particularly to the devices for mounting and regulating the pressure applied to the disk coverer members. I am aware that heretofore potato planters have been constructed with yieldingly mounted coverer members made adjustable in various ways, as for example in Letters Patent No. 658,562, granted to me September 25, 1900, there is shown and described a structure in which the disk coverers are mounted on a saddle with a centrally arranged spring having a thumb screw adjustment. A structure of this kind is entirely inadequate to meet the requirements of more recent potato culture inasmuch as the pressure was unevenly distributed and the depth of the earth made to fill the furrow in relatively deep planting or the height of the ridge in relatively shallow planting could not be accomplished with an apparatus of this construction. Furthermore the spring tension device being centrally placed had a tendency to come into contact with the soil and to become clogged, and still furthermore was not readily adjustable.

The object of my present invention is to overcome these difficulties and to provide in a potato planter a construction by which the coverer members are so mounted as to meet present day conditions and in which an increased or decreased pressure on the coverers may be quickly adjusted in order that a greater depth of earth may be caused to fill the furrow in relatively deep planting or when it is desirable to plant in a shallow furrow, the depth of the covering may still be made to the required extent by forming a high ridge. It will be understood that in the formation of the high ridge to cover the furrow much greater pressure on the coverers is required inasmuch as an increased quantity of earth must be thrown up by the same. Furthermore in carrying out my invention the coverers are so mounted and the tension applied thereto by springs which are placed adjacent the coverers in order that they cannot come into contact with the ridge and become clogged, and being so placed cause an even distribution of the pressure, that is, the pressure is substantially equal on both the coverers irrespective of the adjustment of the tension devices and the tension devices may both be adjusted in a moment's time to secure the desired pressure on the coverers for any given planting.

In the drawing:

Fig. 1 is a plan view of that portion of a potato planter to which my present invention relates, and Fig. 2 is an elevation of the parts of the planter as shown in Fig. 1.

In the drawing the main frame of a potato planter is indicated at 10. This, as is customary, is fitted with bearings 11 in which the main axle of the planter is journaled. The axle is indicated at 12 and, as is customary, has traction wheels mounted thereon, although these wheels are not illustrated in the drawing.

The parts of the invention to which this application relates are particularly the coverer members and the means by which they are yieldingly and adjustably mounted in the frame. The coverers are connected to coverer arms 13 and 14. The coverer arms 13 and 14 are firmly bolted to the castings 15 and 16 by the bolts 17, 18 respectively, as clearly shown in Fig. 1 of the drawing, while the castings 15 and 16 are pivotally connected to the main frame 10 by the bolts or shafts 19, 20 respectively, thus forming a hinge for the coverer frame. Also connected to the castings 15 and 16 is the customary forward yoke 21. This is secured to the castings by the bolts 22 and 23 respectively and adjacent the forward end of the yoke the same is provided with a foot piece 24 by which the coverers and the coverer frame may be raised when desired as in turning the machine or passing from one furrow to another.

Connected to the rearward ends of the coverer arms I employ the usual saddle 25. This is secured to the coverer arms by bolts 26, 27 or otherwise. A coverer shaft 28 is suitably connected in the saddle 25 and at its extremities carries the coverer disks 29 and 30 which are secured revolubly thereon by collars 31, 32 respectively in the usual manner.

Suitably connected to and depending from the main frame 10 I employ brackets 33 and 34, the bracket 33 being provided with a plurality of hitch holes 35 and the bracket 34 with a corresponding series of hitch holes 36. Suitably connected to the saddle 25 adjacent the extremities of the coverer arms I employ uprights 37 and 38. The upright 37 is provided with a series of notches 39 in its rear edge and similarly the upright 38 has a corresponding series of notches 40 in its rear edge.

The tension devices include handles 41 and 42 to which are connected respectively socket extensions 43 and 44 and spring members 45 and 46. These spring members are preferably helical springs of like constructions, the spring 45 being provided at one end with a hook 47 adapted to engage with any of the hitch holes 35 in the bracket 33 while at its opposite end the spring 45 is provided with a hook end 48 adapted to be engaged by the socket extension 43 of the handle 41, which latter may be engaged in any of the notches 39 in the upright 37 after the socket extension 43 is passed over the upright. Similarly the forward end of the spring 46 is provided with a hook end 49 adapted to engage in any of the hitch holes 36 of the bracket 34 and at the opposite end with a hook 50 adapted to engage with the socket extension 44 of the handle 42, the handle 42 being adapted to engage with any of the notches 40 in the upright 38 after its socket extension 44 is passed over the upright.

It will now be apparent that the maximum pressure on the coverers is obtained in the apparatus hereinbefore described by hooking the forward ends of the springs 45 and 46 in the lowermost hitch holes 35, 36 in the brackets 33 and 34 and by placing the handles 41 and 42 in the uppermost notches 39 and 40 of the uprights 37 and 38. Also that the minimum pressure is obtained by engaging the forward ends of the springs with the uppermost hitch holes and the handles with the lowermost notches of the brackets and that any intermediate pressure may be obtained by intermediate connections. It will also be observed that these adjustments or pressures may be effected by simply disconnecting the handles from the uprights and connecting the forward ends of the springs in the desired hitch holes and replacing the handles in position on the uprights. It will be understood that as the brackets 33 and 34 extend from the main frame below the pivotal points of the coverer arms and the uprights 37 and 38 extend upwardly from the saddle 25 above the coverer axis with the notches in their rearward edges preferably above the pivotal points between the coverer arms and the main frame, a maximum range of adjustments is made possible. The springs 45 and 46 being placed at the sides of the frame adjacent the coverers do not interfere with the covering operation or the ridge made thereby and do not come into contact with the soil and consequently will not become clogged, and as will be apparent the desired adjustment may be effected momentarily to obtain any required pressure on the coverers.

I claim as my invention:

1. In a potato planter, a main frame, a coverer frame connected thereto, coverer disks carried by said coverer frame, spaced springs adjacent the coverer disks, and means for connecting the forward ends of the springs to the main frame at points lower than the connection of the coverer frame thereto and the rear ends of the springs to the coverer saddle at points higher than the connection between the coverer frame and the main frame.

2. In a potato planter, a main frame, coverer arms pivotally connected in the main frame, a saddle extending between the rear ends of the coverer arms, coverer disks carried by the coverer arms and the said saddle, springs placed adjacent the said coverer disks, and means for connecting the forward end of each spring in one of a plurality of positions all below the pivotal point between the said arms and main frame and the opposite end of each spring in a plurality of positions normally above the axis of the coverers.

3. In a potato planter, a main frame, coverer arms pivotally connected thereto, a saddle extending between and connected to the coverer arms, coverer disks carried by the said saddle and coverer arms, spring members adjacent the said coverer disks, a bracket connected to the main frame and depending below the same, with a plurality of hitch holes below the pivotal point between the coverer arms and the main frame and in which hitch holes the forward ends of the said springs may be engaged, and means for connecting the other ends of the said springs in one of a plurality of positions normally above the axis of the coverers.

4. In a potato planter, a main frame, coverer arms pivotally connected thereto, a saddle extending between and connected to the coverer arms, coverer disks carried by the said saddle and coverer arms, spring members adjacent the said coverer disks, a bracket connected to the main frame and depending below the same, with a plurality of hitch holes below the pivotal point between the coverer arms and the main frame and in which hitch holes the forward ends of the said springs may be engaged, a handle for each spring having an extension in which the other end of the spring is adapted to engage, and means for engaging the handle in any one of a number of positions normally above the axis of the disk coverers.

5. In a potato planter, a main frame, coverer arms pivotally connected thereto, a saddle extending between and connected to the coverer arms, coverer disks carried by the said saddle and coverer arms, spring members adjacent the said coverer disks, a bracket connected to the main frame and depending below the same, with a plurality of hitch holes below the pivotal point between the coverer arms and the main frame and in which hitch holes the forward ends of the said springs may be engaged, a handle for each spring having an extension in which the other end of the spring is adapted to engage, and an upright mounted in the saddle for each spring and having in its rearward edge a plurality of notches in any one of which the said handle may be engaged.

Signed by me this 7th day of February, 1921.

LEWIS AUGUSTUS ASPINWALL.